United States Patent
Peitzsch

(10) Patent No.: US 10,732,615 B2
(45) Date of Patent: Aug. 4, 2020

(54) SYSTEM AND METHOD FOR MINIMIZING BACKSIDE WORKPIECE DAMAGE

(71) Applicant: Varian Semiconductor Equipment Associates, Inc., Gloucester, MA (US)

(72) Inventor: Scott E. Peitzsch, Tewksbury, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 373 days.

(21) Appl. No.: 15/797,264

(22) Filed: Oct. 30, 2017

(65) Prior Publication Data

US 2019/0129394 A1  May 2, 2019

(51) Int. Cl.
G05B 19/41  (2006.01)
G05B 19/418 (2006.01)

(52) U.S. Cl.
CPC .......... *G05B 19/41875* (2013.01); *G05B 2219/45031* (2013.01)

(58) Field of Classification Search
None
See application file for complete search history.

(56) References Cited

U.S. PATENT DOCUMENTS

| | | |
|---|---|---|
| 5,547,539 A | 8/1996 | Arasawa et al. |
| 5,870,271 A | 2/1999 | Herchen |
| 6,307,728 B1 | 10/2001 | Leeser |
| 2008/0138535 A1 | 6/2008 | Hwang |
| 2010/0015812 A1 | 1/2010 | Nishikawa |
| 2010/0018648 A1 | 1/2010 | Collins et al. |
| 2011/0228439 A1* | 9/2011 | Kobayashi ........ H01L 21/67109 361/234 |
| 2012/0052690 A1* | 3/2012 | Belostotskiy ..... H01J 37/32715 438/715 |
| 2014/0334060 A1 | 11/2014 | Parkhe et al. |
| 2016/0079106 A1* | 3/2016 | Takeuchi .......... H01L 21/67248 361/234 |
| 2016/0196997 A1 | 7/2016 | White et al. |
| 2018/0330926 A1* | 11/2018 | Boyd, Jr. .......... H01L 21/67253 |

FOREIGN PATENT DOCUMENTS

| | | |
|---|---|---|
| CN | 105579612 A | 5/2016 |
| TW | 294819 B | 1/1997 |
| TW | 419775 B | 1/2001 |
| TW | 496809 B | 8/2002 |
| TW | 201448112 A | 12/2014 |

OTHER PUBLICATIONS

International Search Report and Written Opinion dated Jan. 4, 2019 in corresponding PCT application No. PCT/US2018/050155.

* cited by examiner

*Primary Examiner* — Paul B Yanchus, III
(74) *Attorney, Agent, or Firm* — Nields, Lemack & Frame, LLC

(57) ABSTRACT

A system and method for minimizing the damage to the backside of a workpiece disposed on a platen during thermal transitions is disclosed. The system includes a controller that modulates the clamping voltage and backside gas pressure during the thermal transition. By modulating the clamping voltage, the workpiece may not be as tightly held to the platen at certain times, thus minimizing damage that may be caused by particles resident on the top surface of the platen. Furthermore, the modulation of the backside gas pressure still permits good thermal conductivity between the platen and the workpiece.

18 Claims, 3 Drawing Sheets

SYSTEM AND METHOD FOR MINIMIZING BACKSIDE WORKPIECE DAMAGE

FIELD

Embodiments of the present disclosure relate to systems and methods for minimizing damage caused to the back surface of a workpiece while that workpiece is being heated or cooled.

BACKGROUND

The fabrication of a semiconductor device involves a plurality of discrete and complex processes. One such process may be an etch process, where material is removed from the workpiece. Another process may be a deposition process, wherein material is deposited on the workpiece. Yet another process may be an ion implantation process where ions are implanted into the workpiece.

In some embodiments, it may be beneficial to perform one or more of these processes at a temperature different from room temperature. For example, in certain embodiments, an ion implantation process may be best performed at an elevated temperature. In other embodiments, this process may be best performed at a cold temperature.

To prepare the workpiece for this process, a preheat or cooling station may be employed. In certain embodiments, the workpiece is disposed on a platen, the temperature of which is then modified so as to control the temperature of the workpiece. This thermal transition may cause the expansion or contraction of the workpiece.

In some cases, the workpiece may be damaged while the workpiece is disposed on the platen. For example, as the temperature of the workpiece changes, the workpiece expands or contracts, relative to the platen. As the workpiece changes in dimension, particles located on the platen may scratch, mar or otherwise damage the bottom surface of the workpiece, since there is relative movement between the workpiece and the platen. This may result in a radial scratch or gouge. The scratch may lower the overall device yield and therefore increase the cost of producing semiconductor components.

Therefore, it would be beneficial if there were a system and method for minimizing the damage to the backside of the workpiece during these thermal transitions. It would also be advantageous if the system did not significantly impact the time to bring the workpiece to the desired temperature.

SUMMARY

A system and method for minimizing the damage to the backside of a workpiece disposed on a platen during thermal transitions is disclosed. The system includes a controller that modulates the clamping voltage and backside gas pressure during the thermal transition. By modulating the clamping voltage, the workpiece may not be as tightly held to the platen at certain times, thus minimizing damage that may be caused by particles resident on the top surface of the platen. Furthermore, the modulation of the backside gas pressure still permits good thermal conductivity between the platen and the workpiece.

According to one embodiment, a system for minimizing damage to a workpiece during thermal transitions is disclosed. The system comprises a platen comprising a top surface having one or more openings; a plurality of conduits, each of the plurality of conduits in communication with a respective opening; a valving system in communication with the plurality of conduits and in communication with a back side gas supply system; one or more electrodes disposed in the platen to create a clamping force to hold the workpiece to the top surface; an electrode power supply; and a controller, in communication with the valving system to modulate a flow of backside gas to the top surface of the platen and in communication with the electrode power supply to modulate the clamping force applied to the workpiece. In certain embodiments, the electrode power system outputs a first voltage to apply a first clamping force to the workpiece, and a second voltage to apply a second clamping force, less than the first clamping force, to the workpiece. In certain embodiments, the valving system is configured to supply backside gas at a first pressure level, and a second pressure level, less than the first pressure level. In certain embodiments, the first pressure level is supplied when the first clamping force is being applied to the workpiece. In some embodiments, the second clamping force is between 0% and 50% of the first clamping force. In some embodiments, the controller modulates the clamping force and the flow of backside gas at a frequency less than 10 Hz.

According to another embodiment, a non-transitory computer readable storage medium comprising instructions is disclosed. The instructions, when executed by a controller, cause the controller to modulate a clamping force applied to a workpiece disposed on a platen; and modulate a flow of backside gas to a top surface of the platen while the workpiece is disposed on the platen. In certain embodiments, the controller is in communication with an electrode power supply, and the instructions, when executed by a controller, cause the electrode power supply to output a first voltage to apply a first clamping force to the workpiece, and a second voltage to apply a second clamping force, less than the first clamping force, to the workpiece. In certain embodiments, the controller is in communication with a valving system, and the instructions, when executed by the controller, cause the valving system to supply backside gas at a first pressure level, and at a second pressure level, less than the first pressure level. In certain embodiments, the instructions, when executed by the controller, cause the first pressure level to be supplied when the first clamping force is being applied to the workpiece.

According to another embodiment, a method of minimizing damage to a workpiece during thermal transitions is disclosed. The method comprises disposing a workpiece on a heated platen; modulating a clamping force and a flow of backside gas to a top surface of the heated platen while the workpiece is disposed on the platen; and removing the workpiece when the workpiece reaches a desired temperature. In certain embodiments, the clamping force and the flow of backside gas are modulated at a frequency less than 10 Hz.

BRIEF DESCRIPTION OF THE FIGURES

For a better understanding of the present disclosure, reference is made to the accompanying drawings, which are incorporated herein by reference and in which.

DETAILED DESCRIPTION

As described above, semiconductor device fabrication includes various processes, including the etch process, the deposition process and ion implantation. One or more of these processes may be sensitive to temperature. In some embodiments, a preheat or cooling station is used to modify the temperature of the workpiece prior to subjecting the workpiece to this semiconductor process.

Figure 1:
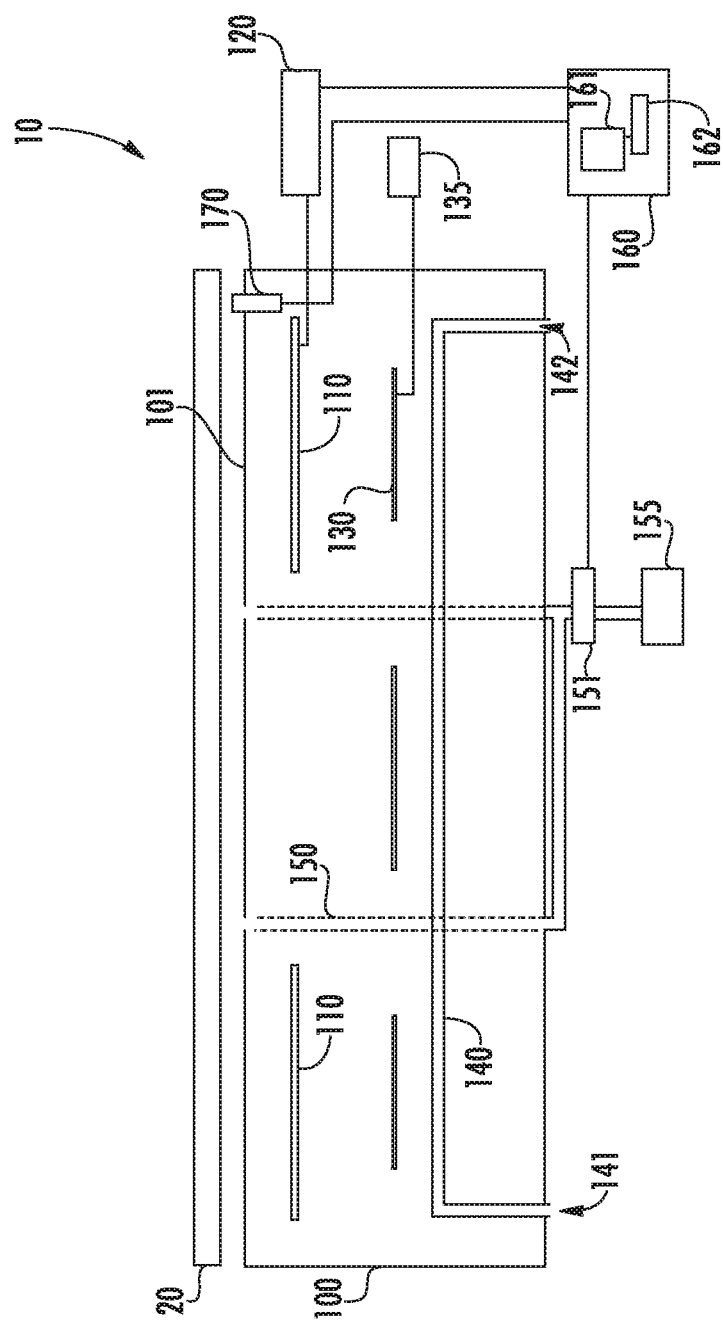
FIG. 1 is a cross-sectional view of the system for minimizing damage to the backside of the workpiece according to one embodiment.

FIG. 1 shows a system that may be used to change the temperature of the workpiece while minimizing damage to the bottom surface, or backside, of the workpiece. The system 10 includes a platen 100. The platen includes one or more electrodes 110 disposed therein. These electrodes 110 are in communication with an electrode power supply 120. The electrode power supply 120 may supply a DC or AC voltage to the electrodes 110. The frequency and amplitude of the voltage supplied to the electrodes 110 may be dictated by the design and are not limited by this disclosure. In certain embodiments, the electrodes may be arranged in pairs, where voltages of opposite polarity are provided to the pair.

The platen 100 may also include heaters 130 embedded in the platen 100. These heaters 130 may be used to heat the platen 100 to a desired temperature. These heaters 130 may be resistive elements, where current is passed through the heaters 130 to increase their temperature. The heaters 130 may be in communication with a heating power supply 135. In certain embodiments, the heaters 130 and heating power supply 135 may not be included if the platen 100 is used as part of a cooling station.

The platen 100 may also include embedded fluid channels 140 that include an inlet 141 and an outlet 142. In certain embodiments, a fluid source is in communication with the inlet 141. Fluid may enter the platen 100 through the inlet 141, pass through the fluid channels 140 and exit through the outlet 142. In some embodiments, this fluid may be cooled, such as cooled water or liquid nitrogen. In other embodiments, the fluid may be heated, such as heated water. In some embodiments, a pump may be used to recirculate the fluid passing through the fluid channels 140. In certain embodiments, the fluid channels 140 may not be included in the platen 100.

Backside gas channels 150 may pass through the platen 100 terminating on the top surface 101 of the platen 100. The backside gas channel 150 may be in communication with a gas source 155. A valving system 151, such as a Mass Flow Controller (MFC) or simply on-off valve, may be used to control the flow of gas from the gas source 155 to the backside gas channels 150. Backside gas is introduced into the volume between the top surface 101 of the platen 100 and the backside of the workpiece. This backside gas increases the thermal conductivity between the top surface of the platen 100 and the workpiece 20. In certain embodiments, the backside gas may be supplied at a pressure of about 4-8 Torr.

A controller 160 may be in communication with the electrode power supply 120 and the valving system 151. The controller 160 has a processing unit 161 and an associated memory device 162. This memory device 162 contains the instructions, which, when executed by the processing unit 161, enable the system 10 to perform the functions described herein. This memory device 162 may be a non-volatile memory, such as a FLASH ROM, an electrically erasable ROM or other suitable devices. In other embodiments, the memory device 162 may be a volatile memory, such as a RAM or DRAM. In certain embodiments, the controller 160 may be a general purpose computer, an embedded processor, or a specially designed microcontroller. The actual implementation of the controller 160 is not limited by this disclosure.

During normal operation, a workpiece 20 is disposed on the top surface 101 of the platen 100. The workpiece 20 is then clamped to the platen by actuating the electrode power supply 120. The voltage supplied to the electrode 110 creates a clamping force which holds the workpiece 20 against the top surface 101. Once the clamping force is applied, the backside gas may be provided to the backside gas channels 150. This backside gas fills the volume between the backside of the workpiece 20 and the top surface 101 of the platen 100.

In certain embodiments, the platen 100 is maintained at a certain temperature, either by flowing fluid through the fluid channels 140 or energizing the heaters 130. In this way, the workpiece 20 begins the thermal transition as soon as the workpiece 20 is placed on the top surface 101 of the platen 100. In other embodiments, the platen 100 is heated after the workpiece 20 is placed on the top surface 101.

Figure 2:
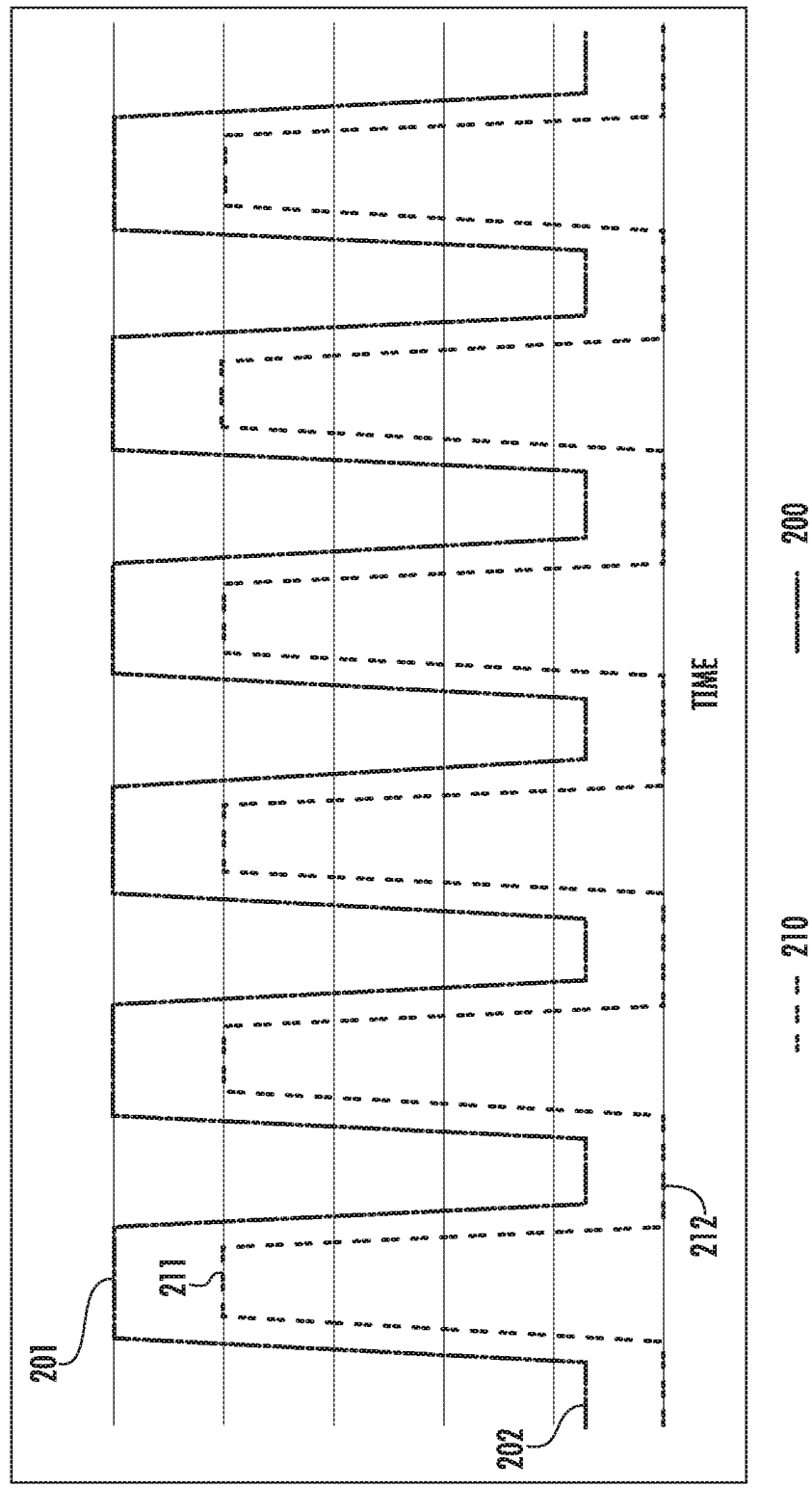
FIG. 2 shows a waveform illustrating the clamping force and the backside gas pressure according to one embodiment.

To minimize the possibility of damage to the backside of the workpiece 20 during the thermal transition, the controller 160 may modulate the clamping force and the backside gas pressure. FIG. 2 shows a waveform illustrating the clamping force 200 and the backside gas pressure 210. As seen in FIG. 2, the controller 160 modulates the voltage supplied by the electrode power supply 120 to change the clamping force from a first clamping level 201, where the workpiece is tightly held to the top surface 101, to a second clamping level 202, which is lower than the first clamping level 201. In certain embodiments, the second clamping level 202 may be 0-50% of the first clamping level 201. In one particular embodiment, the first clamping level 201 may be 1 kV and the second clamping level may be 0 kV. Of course, other voltages may be used.

The clamping force 200 may be reduced in a number of ways. In one embodiment, the amplitude of the voltage supplied by the electrode power supply 120 is reduced. In another embodiment, the duty cycle of the AC voltage supplied to the electrodes 110 is modified. In yet another embodiment, both the amplitude and the duty cycle of the voltage supplied to the electrode 110 may be modified.

As shown in FIG. 2, the clamping voltage may be a periodic signal. The frequency of the clamping force may be less than 10 Hz, such as between 0.2 and 5 Hz, although other values may be used. Additionally, the duty cycle of the clamping force, which is defined as the time duration at the first clamping level as a percentage of the total time, may be between 20-70%, although other values may be employed.

Note that the backside gas pressure 210 is also modulated between a first pressure level 211 and a second pressure level 212, which is less than the first pressure level 211. The first pressure level 211 may be between 4-8 Torr, although other values are also possible. In certain embodiments, the second pressure level 212 is zero, although greater values may be employed in some embodiments.

The frequency of the backside gas pressure 210 is the same as the frequency of the clamping force 200. In some embodiments, to insure that the backside gas pressure does not displace or move the workpiece, the first pressure level 211 of the backside gas pressure 210 is applied when the clamping force 200 is at the first clamping level 201, as shown in FIG. 2. Consequently, the duty cycle of the backside gas pressure 210 is the lower than the duty cycle of the clamping force 200.

The phase relationship between the first clamping level 201 of the clamping force 200 and the first pressure level 211 of the backside gas pressure 210 may be adjusted to achieve optimal performance. Similarly, the phase relationship between the second clamping level 202 of the clamping force 200 and the second pressure level 212 of the backside gas pressure 210 may be adjusted to achieve optimal performance.

Although FIG. 2 shows a trapezoidal waveform, other waveforms are also possible. For example, the waveforms for the clamping voltage and/or the backside gas pressure may be sinusoidal, sawtooth, triangular, square wave or any other periodic function.

The controller 160 modulates the electrode power supply 120 and the valving system 151 as shown in FIG. 2 until the workpiece 20 reaches the desired temperature. Once the desired temperature has been reaches, the clamping force and the backside gas pressure may be reduced so that the workpiece 20 may be removed from the platen 100.

Figure 3:
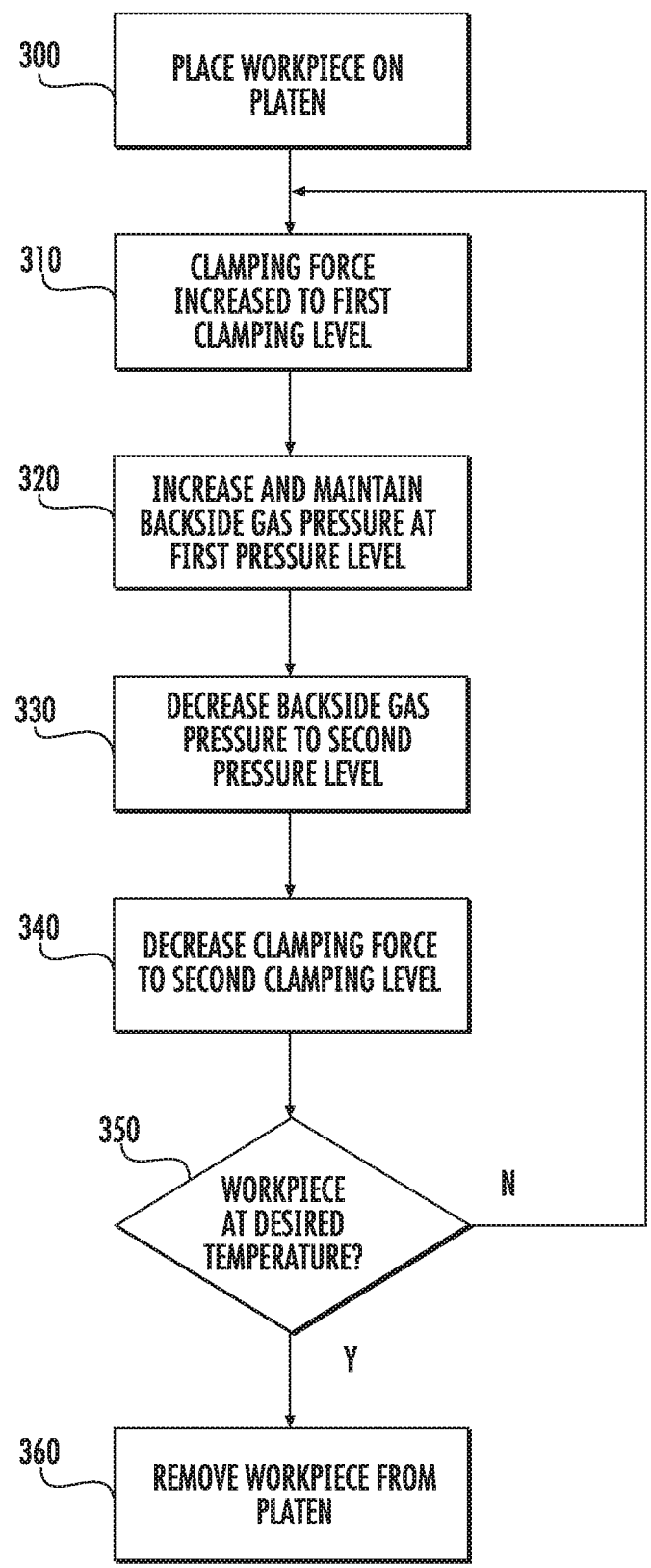
FIG. 3 is a flowchart showing the operation of the system of FIG. 1.

FIG. 3 shows a flowchart representative of the operation of the system according to one embodiment. First, as shown in Box 300, the workpiece 20 is placed on the platen 100. The clamping force is then increased to the first clamping level 201, as shown in Box 310. The backside gas pressure is then increased to the first pressure level 211 and maintained at this level for a first predetermined time duration, as shown in Box 320. As described above, the time duration between Box 310 and Box 320 may be varied to achieve optimal system performance. In Box 330, the backside gas pressure is decreased to the second pressure level 212. The clamping force is then decreased to the second clamping level 202, as shown in Box 340. As described above, the time duration between Box 330 and Box 340 may be varied to achieve optimal system performance. A check of whether the workpiece has reached the desired temperature is then performed, as shown in Box 350. If the workpiece 20 has reached the desired temperature, the clamping force and the backside gas pressure are reduced to 0. The temperature of the workpiece 20 may be measured directly, such as by using a temperature sensor 170. The temperature sensor 170 may be in communication with the controller 160 and may be disposed in the platen 100, or external to the platen 100. Alternatively, the temperature may be inferred indirectly, such as based on the duration of time that the workpiece 20 is disposed on the platen 100. The workpiece 20 can then be removed from the platen 100, as shown in Box 360. If the workpiece 20 has not reached the desired temperature, the sequence continues by returning to Box 310. The time duration between Box 340 and Box 310 may be varied to achieve optimal system performance.

FIG. 1 shows the system that may be used to minimize damage to the backside of a workpiece while that workpiece is undergoing thermal transitions. In certain embodiments, an existing preheat or cooling station may be modified to perform the operations shown in FIG. 3. For example, in one embodiment, a software program, comprising instructions that may be executed on the processing unit 161 of the controller 160, may be downloaded into the controller 160. The software program may be disposed on a non-transitory medium, such as a CD ROM, or a memory device. That software program may be downloaded into the memory device 162 disposed in the controller 160. This software program, when executed, comprises instructions which, when executed by the controller, allow the controller 160 to execute the sequences described herein and shown in Boxes 310-350 in FIG. 3.

The system and method described herein have many advantages. As noted above, when a workpiece undergoes a thermal transition, that workpiece may expand or contract. This change in dimension causes the workpiece to move relative to the platen on which the workpiece is disposed. Any particle that are on the top surface of the platen may scratch or otherwise damage the workpiece as the workpiece changes dimension. The present system and method allow the workpiece to expand or contract more freely relative to the top surface of the platen, which may minimize or eliminate the possibility of damage to the workpiece.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for minimizing damage to a workpiece during thermal transitions, comprising:
 a platen comprising a op surface having one or more openings;
 a plurality of conduits, each of the plurality of conduits in communication with a respective opening;
 a valving system in communication with the plurality of conduits and in communication with a back side gas supply system;
 one or more electrodes disposed in the platen to create a clamping force to hold the workpiece to the top surface;
 an electrode power supply; and
 a controller, in communication with the valving system to modulate a flow of backside gas to the top surface of the platen and in communication with the electrode power supply to modulate the clamping force applied to the workpiece, wherein the clamping force is increased and decreased a plurality of times.

2. The system of claim 1, wherein the electrode power system outputs a first voltage to apply a first clamping force to the workpiece, and a second voltage to apply a second clamping force, less than the first clamping force, to the workpiece.

3. The system of claim 2, wherein the valving system is configured to supply backside gas at a first pressure level, and a second pressure level, less than the first pressure level.

4. The system of claim 3, wherein the first pressure level is supplied when the first clamping force is being applied to the workpiece.

5. The system of claim 2, wherein the second clamping force is between 0% and 50% of the first clamping force.

6. The system of claim 1, wherein the controller modulates the clamping force and the flow of backside gas at a frequency less than 10 Hz.

7. A non-transitory computer readable storage medium, comprising instructions, which, when executed controller, cause the controller to:
  modulate a clamping force applied to a workpiece disposed on a platen, wherein the clamping force is increased and decreased a plurality of times; and
  modulate a flow of backside gas to a top surface or the platen while the workpiece is disposed on the platen.

8. The non-transitory computer readable storage medium of claim 7, wherein the controller is in communication with an electrode power supply, and wherein the instructions, when executed by a controller, cause the electrode power supply to output a first voltage to apply a first clamping force to the workpiece, and a second voltage to apply a second clamping force, less than the first clamping force, to the workpiece.

9. The non-transitory computer readable storage medium of claim 8, wherein the controller is in communication with a valving system, and wherein the instructions, when executed by the controller, cause the valving system to supply backside gas at a first pressure level, and at a second pressure level, less than the first pressure level.

10. The non-transitory computer readable storage medium of claim 9, wherein the instructions, when executed by the controller, cause the first pressure level to be supplied when the first clamping force is being applied to the workpiece.

11. The non-transitory computer readable storage medium of claim 8, wherein the second clamping force is between 0% and 50% of the first clamping force.

12. The non-transitory computer readable storage medium of claim 9, wherein the instructions, when executed by the controller, modulate the clamping force and the flow of backside gas at a frequency less than 10 Hz.

13. A method of minimizing damage to a workpiece during thermal transitions, comprising:
  disposing a workpiece on a heated platen;
  modulating a clamping force and a flow of backside gas to a top surface of the heated platen while the workpiece is disposed on the heated platen, wherein the clamping force is increased and decreased a plurality of times; and
  removing the workpiece when the workpiece reaches desired temperature.

14. The method of claim 13, wherein the clamping force is modulated between a first clamping force and a second clamping force, less than the first clamping force.

15. The method of claim 14, wherein the flow of backside gas is modulated between a first pressure level and a second pressure level, less than the first pressure level.

16. The method of claim 15, wherein the first pressure level is supplied when the first clamping force being applied to the workpiece.

17. The method of claim 14, wherein the second clamping force is between 0% and 50% of the first clamping force.

18. The method of claim 13, wherein the clamping force and the flow of backside gas are modulated at a frequency less than 10 Hz.

* * * * *

UNITED STATES PATENT AND TRADEMARK OFFICE
CERTIFICATE OF CORRECTION

| | | |
|---|---|---|
| PATENT NO. | : 10,732,615 B2 | Page 1 of 1 |
| APPLICATION NO. | : 15/797264 | |
| DATED | : August 4, 2020 | |
| INVENTOR(S) | : Scott E. Peitzsch | |

It is certified that error appears in the above-identified patent and that said Letters Patent is hereby corrected as shown below:

In the Claims

Claim 1, Line 3, "a op surface" should read --a top surface--

Claim 7, Line 7, "a top surface or the platen" should read --a top surface of the platen--

Signed and Sealed this
Fifteenth Day of August, 2023

Katherine Kelly Vidal
*Director of the United States Patent and Trademark Office*